United States Patent [19]

Somatomo et al.

[11] Patent Number: 5,312,560
[45] Date of Patent: May 17, 1994

[54] RARE EARTH PHOSPHOR

[75] Inventors: Toshifumi Somatomo; Masaki Mori; Miyuki Sumitomo; Kouichi Kunikata; Katsunori Uchimura, all of Anan, Japan

[73] Assignee: Nichia Chemical Industries, Ltd., Tokushina, Japan

[21] Appl. No.: 33,331

[22] Filed: Mar. 18, 1993

[30] Foreign Application Priority Data

Mar. 19, 1992 [JP] Japan .................. 4-093523
Apr. 25, 1992 [JP] Japan .................. 4-131911

[51] Int. Cl.$^5$ .................................. C09K 11/84
[52] U.S. Cl. .................................. 252/301.4 S
[58] Field of Search .................. 252/301.4 S

[56] References Cited

U.S. PATENT DOCUMENTS 3,974,389  8/1976  Ferri et al. ............ 252/301.4 S
4,113,648  9/1978  Ferri et al. ............ 252/301.4 S

FOREIGN PATENT DOCUMENTS 53-11178   2/1978  Japan .
53-28146   8/1978  Japan .
56-151783  11/1981 Japan .
62-253685  11/1987 Japan ................ 252/301.4 S

*Primary Examiner*—Jack Cooper
*Attorney, Agent, or Firm*—Nixon & Vanderhye

[57] ABSTRACT

Phosphors capable of emitting substantially white luminescent were represented by the following general formulae, (I), (II) and (III).

$$(Y_{1-X-Y-Z} Lu_X Tb_Y Sm_Z)_2 O_2 S \quad (I)$$

$0 < X \leq 5 \times 10^{-2}$
$1 \times 10^{-3} \leq Y \leq t \times 10^{-3}$
$0 \leq Z \leq 5 \times 10^{-2}$ $$(Y_{1-a-b-c} Yb_a Tb_b Sm_c)_2 O_2 S \quad (II)$$

wherein:
$0 < a \leq 5 \times 10^{-4}$
$1 \times 10^{-3} \leq b \leq 5 \times 10^{-3}$
$0 \leq c \leq 5 \times 10^{-2}$ $$(Y_{1-d-e-f} Ce_d Tb_e Sm_f)_2 O_2 S \quad (III)$$

wherein $0 < d \leq 1 \times 10^{-4} \times 10^{-3} \leq e \leq 5 \times 10^{-3}$
$0 \leq f \leq 5 \times 10^{-2}$

4 Claims, 16 Drawing Sheets

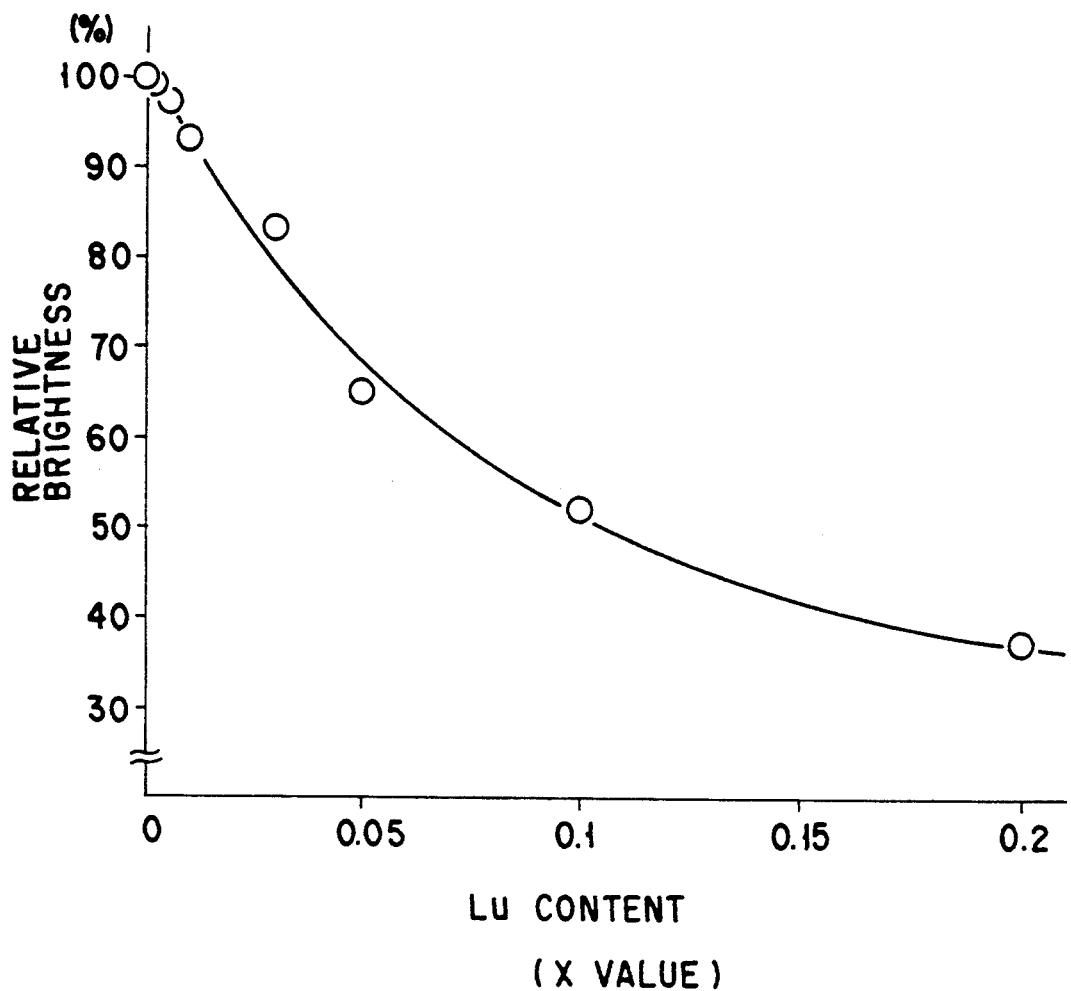
F I G. 5

RARE EARTH PHOSPHOR

BACKGROUND OF THE INVENTION

1. Field of the Invention

The present invention relates to a rare earth phosphor for use in a cathode-ray tube (CRT), and more particularly to a rare earth phosphor for use in a CRT for a liquid-crystal-color shutter display system.

2. Description of the Related Art

Recently a CRT for use in a liquid-crystal-color-shutter (hereinafter referred to as "LCS") display system has been drawing attention. I the LCS display system, the LCS is placed in front of a monochrome CRT. The polarizer and $\pi$ cells of the LCS separate emission from the monochrome CRT into the blue(B), green(G) and red(R) components, and then these components are made to overlap appropriately another or two others and the brightness of the CRT is appropriately changed, thereby generating various kinds of colors.

In a shadow-mask-type CRT, a variety of colors is produced by applying three electron beams from three electron guns to three phosphor dots of G, B and R. However, in the monochrome CRT, one electron gun can serve a variety of colors. The LCS display system using the monochrome CRT is therefore advantageous in providing a good resolution. In addition, since the LCS is placed in front of the monochrome CRT, the color of the display surface appears black, not gray as in the shadow-mask-type CRT. The LCS display system is advantageous in providing excellent contrast, as well.

However, the LCS has but a low transmittance. To obtain the brightness to the same extent as in a conventional CRT, it is necessary to increase the brightness of the monochrome CRT placed behind the LCS.

It is demanded that phosphors used for a monochrome CRT in a LCS display system should have a single phosphor capable of emitting white-like luminescence. More preferably, a phosphor having a luminescence spectrum comprising three peaks in ranges of wavelengths of G, B, and R, respectively. When a phosphor mixture is used for a monochrome CRT, and an uneven color is displayed depending on a size of a spot on which an electron beam impinges. Furthermore, for a phosphor used in the monochrome CRT, the ratio of three peaks of the phosphor must be adjusted to a value suitable for the polarizer used known as an example of a phosphor satisfying the above-described requirements is P45 phosphor (JEDEC) represented by $(Y, Tb)_2O_2S$. Another example that may be used is $(Y, Tb, Sm)_2O_2S$ phosphor disclosed in Published Examined Japanese Patent Application No. 53-28146.

FIG. 1 shows a luminescence spectrum of $(Y_{0.9967} Tb_{0.0025} Sm_{0.0008})_2O_2S$ phosphor. In a LCS, for example, peaks in the vicinity of 418 nm, 545 nm, and 608 nm, used as a blue component, a yellow-green component, an orange component—all dispersed from the above described phosphor—are separated, and then made to overlap another or two others, thereby displaying desired individual colors.

As described above, the brightness of a LCS display totally depends on the brightness of a monochrome CRT placed behind the LCS, that is, the brightness of the phosphor. Accordingly, in order to improve the brightness of a LCS, it is necessary to excite the phosphor by increasing the current density. However, since conventional phosphors do not have good current properties, the brightness of the LCS has not been increased.

In other words, the conventional phosphors have a tendency to generate so-called "brightness saturation", which is the phenomenon that the brightness can no longer be increased even if a phosphor is excited at a current density beyond a certain value. There is another problem with the conventional phosphors. When a phosphor is kept excited at the high current density, it develops a phenomenon called "burning", which changes color of the phosphor itself, reducing the brightness. Thus, the brightness of a monochrome CRT has not been improved.

SUMMARY OF THE INVENTION

It is an object of the present invention to provide a rare earth phosphor which helps to produce a monochrome CRT having high brightness when used in a LCS over a high current density range, and scarcely occurring brightness saturation and burning.

The phosphor of the present invention comprises the first, second and third embodiments, which are represented by the following general formulae, respectively:

$$(Y_{1-X-Y-Z} Lu_X Tb_Y Sm_Z)_2O_2S \qquad (I)$$

$$0 < X \leq 5 \times 10^{-2}$$
$$1 \times 10^{-3} \leq Y \leq 5 \times 10^{-3}$$
$$0 \leq Z \leq 5 \times 10^{-2}$$

$$(Y_{1-a-b-c} Yb_a Tb_b Sm_c)_2O_2S \qquad (II)$$

wherein: $0 < a \leq 5 \times 10^{-4}$

$$1 \times 10^{-3} \leq b \leq 5 \times 10^{-3}$$
$$0 \leq c \leq 5 \times 10^{-2}$$

$$(Y_{1-d-e-f} Ce_d Tb_e Sm_f)_2O_2S \qquad (III)$$

$$1 \times 10^{-3} \leq e \leq 5 \times 10^{-3}$$

$$0 \leq f \leq 5 \times 10^{-2}$$

Each of the above-described phosphors is capable of emitting substantially white-color luminescence as a single substance, especially having a luminescence spectrum which comprises three peaks at wavelengths of G, B and R. Further, these phosphors can emit at high brightness, without occurring brightness saturation or burning, when excited at a high current density of 50 $\mu A/cm^2$ under an acceleration voltage of 27 kV.

Additional objects and advantages of the invention will be set forth in the description which follows, and in part will be obvious from the description or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 is a graph showing the relationship between the Lu content and the relative brightness of $(Y_{1-x}Lu_x Tb0.0025 Sm0.0008)_2O_2$ relative to the brightness of conventional phosphors;

DETAILED DESCRIPTION OF THE PREFERRED EMBODIMENTS

The present inventors have made intensive and extensive studies on rare earth phosphors, each consisting of a single substance, capable of emitting white luminescence having peaks especially in ranges of wavelengths of G, B and R—with a view toward improving the brightness saturation and the burning which had not been attained by conventional phosphors. They have found that the above-described problems can be solved by adding a predetermined amount of lutetium(Lu), ytterbium(Yb) or cerium(Ce) to (Y, Tb, Sm)$_2$O$_2$ S phosphor. Based on these findings, the present invention has been made.

The rare earth phosphors according to the present invention are classified into the following three embodiments;

The first embodiment is a phosphor represented by the following general formula (I):

$(Y_{1-X-Y-Z} Lu_X Tb_Y Sm_Z)_2O_2S$    (I)

wherein $0 \leq X \leq 5 \times 10^{-2}$ $1 \times 10^{-3} \leq Y \leq 5 \times 10^{-3}$ $0 \leq Z \leq 5 \times 10^{-2}$ The second embodiment is a phosphor represented by the following general formula (II):

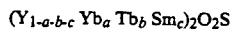

$(Y_{1-a-b-c} Yb_a Tb_b Sm_c)_2O_2S$ wherein $0 < a \leq 5 \times 10^{-4}$ $1 \times 10^{-3} \leq b \leq 5 \times 10^{-3}$ $0 \leq c \leq 5 \times 10^{-2}$ The third embodiment is a phosphor represented by the following general formula (III):

$(Y_{1-d-e-f} Ce_d Tb_e Sm_f)_2O_2S$    (III)

wherein:

$0 < d \leq 1 \times 10^{-4}$ $1 \times 10^{-3} \leq e \leq 5 \times 10^{-3}$ $0 \leq f \leq 5 \times 10^{-2}$ These phosphors can be obtained by a conventional method of manufacturing a rare earth phosphor, comprising the following steps;

measuring predetermined components selected from raw materials of rare earth oxides, such as yttrium oxide, terbium oxide, lutetium oxide, ytterbium oxide, cerium oxide, samarium oxide and the like to have a pre-determined molar ratio, and dry-blending the measured components with sulfur and a suitable flux, such as an alkali meta e.g., sodium carbonate, lithium fluoride or an alkaline earth metal, and then baking the mixture.

Alternatively, these phosphors can be obtained by performing the following steps;

dissolving the above-described raw materials of rare earth oxides having a predetermined molar ratio in a acid solution, adding an oxalic acid solution to the resultant solution to obtain a precipitate as a oxalic salt, baking the oxalic salt to obtain an oxide thereof, and adding sulfur and a flux, and then subjected to additional baking or baking under atmosphere of hydrogen sulfide without adding sulfur and a flux.

Figure 2:
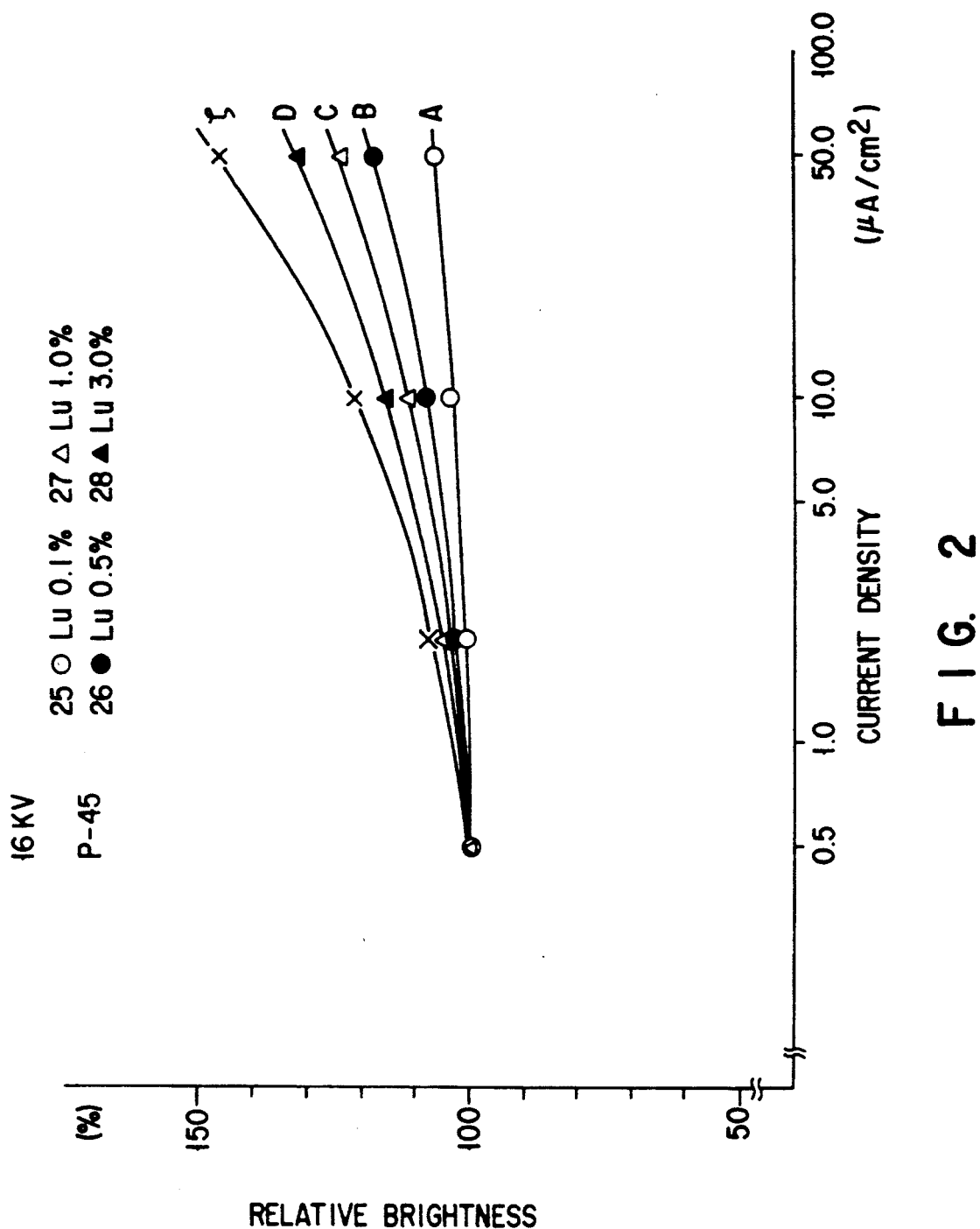
FIG. 2 is a graph showing the relationship between the current density and the relative brightness of the various phosphors the first embodiment of the present invention manufactured, varying according to Lu content relative to the initial brightness thereof when layers formed of the above-described phosphors are excited under an acceleration voltage of 16 kV.

First of all, the first type represented by the following general formula (I) will be described;

$$(Y_{1-X-Y-Z} Lu_X Tb_Y Sm_Z)_2 O_2 S \qquad (I)$$

wherein $0 < X \leq 5 \times 10^{-2}$ $1 \times 10^{-3} \leq Y \leq 5 \times 10^{-3}$ $0 \leq Z \leq 5 \times 10^{-2}$ FIG. 2 is a graph showing the relationship between the current density and the relative brightness with respect to a layer formed of $(Y_{1-X} Lu_X Tb_{0.0025} SmO_{0.0008})_2 O_2 S$ phosphor of the first type of the present invention, varying according to the lutetium content (value X) thereof. In FIG. 2, the value X of curves A, B, C, D, and ε is 0.001, 0.005, 0.01, 0.03, and 0.05, respectively. The acceleration voltage is fixed to 16 kV during this experiment. When layers formed of the phosphors A to D are excited at a current density of 0.5 $\mu A/cm_2$ under an acceleration voltage of 16 kV, the brightness of the phosphor layers are assumed to be 100%, and the brightness of the respective phosphor layers is exhibited in a value relative to the 100% brightness.

Figure 3:
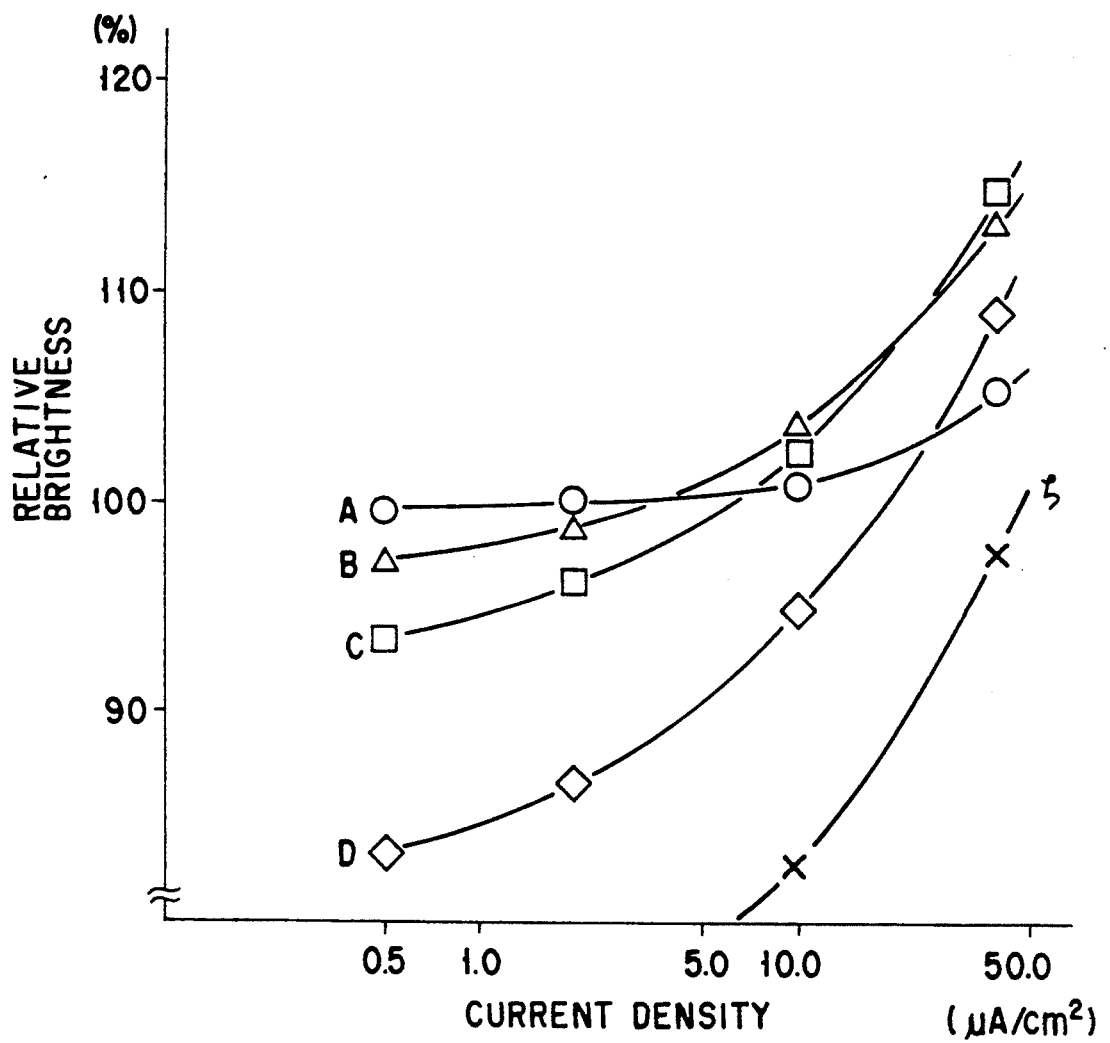
FIG. 3 is a graph showing the relationship between the current density and the relative brightness of various phosphors of the first embodiment of the present invention manufactured, varying according to the Lu content relative to the brightness of the conventional phosphors when the phosphor layers are excited under an acceleration voltage of 16 kV.

FIG. 3 is a graph showing the relationship between the current density and the relative brightness with respect to the layers formed of phosphors A, B, C, D and ε. These relative brightness is shown in terms of percentage relative value to 100% brightness when a layer formed of $(Y_{0.9967}Tb_{0.0025} Sm_{0.0008})_2O_2S$ phosphor containing no Lu is excited at various current densities under an acceleration voltage of 16 kV.

Figure 4:
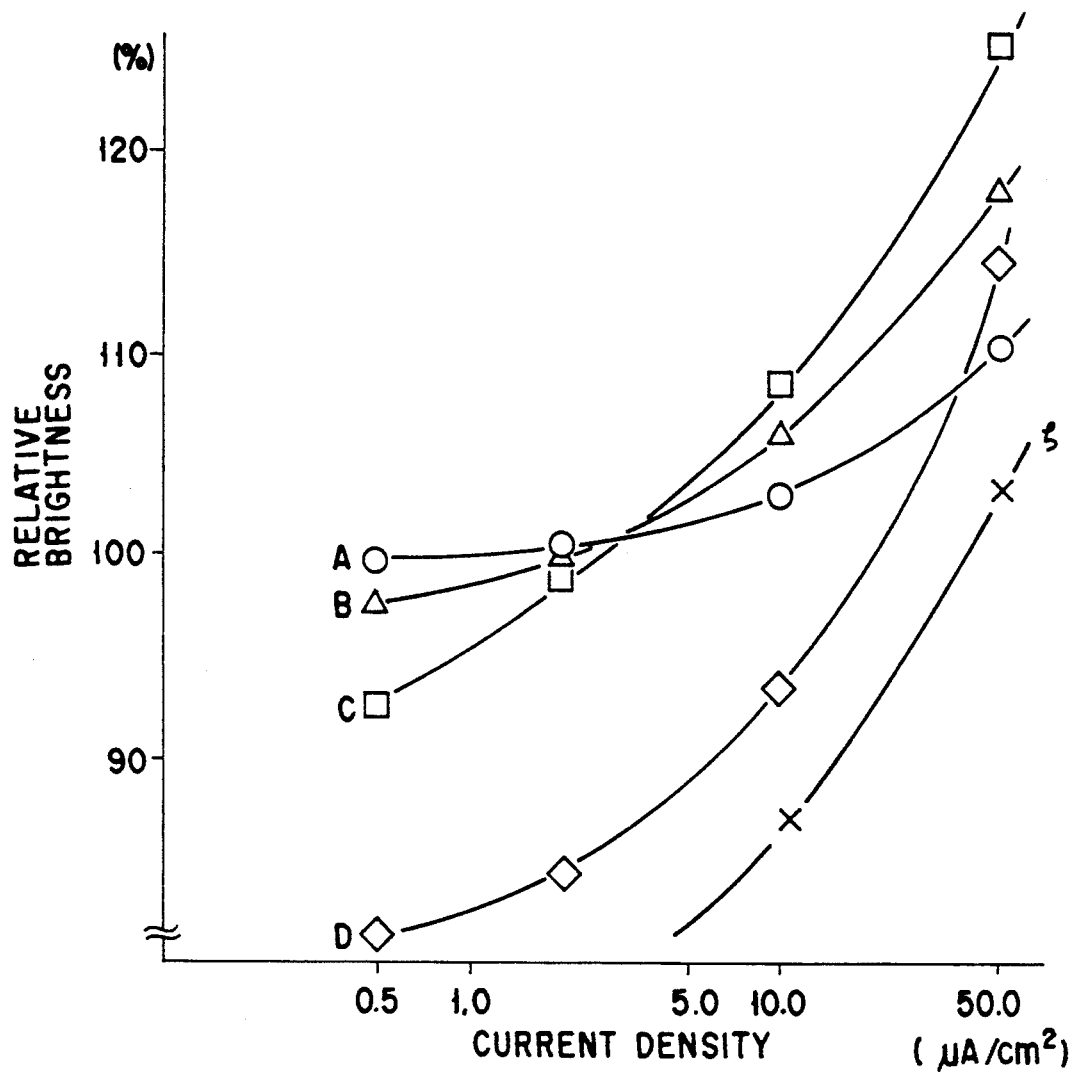
FIG. 4 is a graph showing the relationship between the current density and the relative brightness of various phosphors of the first embodiment of the present invention manufactured, varying according to Lu content relative to the brightness of the conventional phosphors when the phosphor layers are excited under an acceleration voltage of 27 kV.

FIG. 4 is a graph showing the relationship between the current density and the relative brightness of layers formed of the phosphors A to ε shown in FIG. 3 when the phosphor layers are excited by various current densities under an acceleration voltage of 27 kV. Assuming the brightness of a layer formed of $(Y_{0.9967} Tb_{0.0025} Sm_{0.0008})_2O_2S$ phosphor containing no Lu to be 100% when the phosphor layer is excited at various current densities under an acceleration voltage of 27 kV, the brightness in FIG. 4 is shown as relative value thereto.

As shown in FIGS. 3 and 4, the brightness of the above-described phosphor layers decreases to some extent in the low current density range due to the Lu content. However, in proportion to the increase in current density, the brightness increases due to the Lu content. In particular, the effect of Lu is remarkable at an acceleration voltage of 27 kV. As compared with conventional phosphors, the phosphor containing Lu is overwhelmingly superior in improving the brightness thereof. The measurement of brightness was conducted at various current densities up to 50 $\mu A/cm_2$ under an acceleration voltage of 27 kV. No brightness saturation has not been observed. The acceleration voltage and the current density usually used in a CRT are approximately 16 kV and 2 $\mu A/cm^2$, respectively so that these phosphors are considered suitable for a practical use.

FIG. 5 is a graph showing the relationship between the powder brightness and the lutetium content when $(Y_{1-X} Lu_X Tb_{0.0025} Sm_{0.0008})_2O_2S$ phosphor, is excited at a current density of 0.5 $\mu A/cm_2$ under an acceleration voltage of 7 kV which is varied in accordance with the value X not only within but also beyond a scope of the present invention. In FIG. 5, The brightness of a layer formed of $(Y_{0.9967} TbO_{0.0025} Sm_{0.0008})_2O_2S$ phosphor, containing no Lu is assumed to be 100% when the phosphor layer is excited at a current density of 0.5 $\mu A/cm^2$ under an acceleration voltage of 7 kV. The powder brightness is exhibited in a value relative to the 100% brightness described above. Valve X is preferably 0.001 to 0.03.

Figure 6:
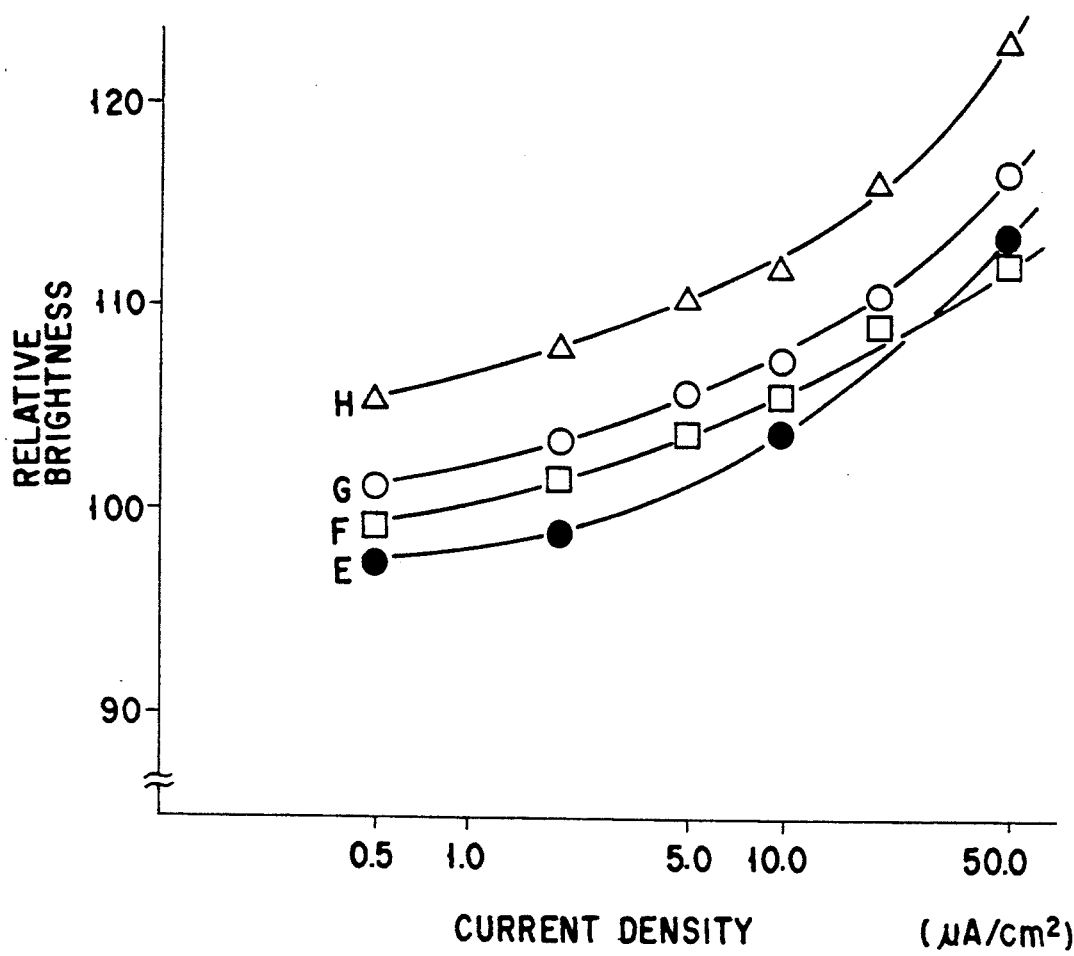
FIG. 6 is a graph showing the relationship between the current density and the relative brightness of various types of $(Y_{1-x} Lu_{0.005} Tb_Y Sm_{0.0008})_2O_2$ phosphors manufactured, varying according to the Tb content.

FIG. 6 is a graph showing the relationship between the current density and the relative brightness of a layer formed of $(Y_{1-Y}Lu_{0.005} Tb_Y Sm_{0.0008})_2O_2S$ phosphor, varying the terbium content (value Y). In this graph, value Y in curves E, F, G, and H is 0.0025, 0.0028, 0.003, and 0.035, respectively. In the same way as is shown in FIG. 3, the brightness of a layer formed of $(Y_{0.9967} Tb_{0.0025} Sm_{0.0008})_2O_2S$ phosphor containing no Lu is assumed to be 100% when the phosphor layer is excited at various current densities under an acceleration voltage of 16 kV. The brightness of the phosphor layers is exhibited in a value relative to the 100% brightness described above.

As shown in FIG. 5, the brightness of the $(Y_{1-X-Y-Z} Lu_X Tb_Y Sm_Z)_2O_2S$ phosphor tends to decrease in proportion to the increase in the Lu content. However, as is shown in FIG. 6, the deterioration in the brightness caused by Lu is prevented by increasing Tb content.

As described above, in the phosphor of the present invention represented by the general formula $(Y_{1-X-Y-Z} Lu_X Tb_Y Sm_Z)_2O_2S$, the brightness saturation caused by increasing the current density is suppressed when value X (Lu content) is larger than 0; by contrast, the brightness thereof tends to be decreased. As shown FIG. 3, phosphor E having value X of $5 \times 10^{-2}$ shows relative brightness of 98% when excited at a current density of 50 $\mu A/cm^2$.

Furthermore, several types of phosphors are manufactured, varying according to value Y (Tb content). A luminescence spectrum is measured with respect to layers formed of the above-obtained phosphors. When value Y is approximately 0.001 or more, there are obtained peaks at the wavelengths in the vicinity of 418 nm and 545 nm, respectively. In proportion to the increase in value Y, the peak value at the wavelength of 545 nm is increased; by contrast, the peak value at the wavelength of 418 nm is decreased. Taking a balance of the both peaks into consideration, a preferable range which provides acceptable white luminescence is determined to be $1 \times 10^{-3} \leq Y \leq 5 \times 10^{-3}$. When value Y is smaller than 0.001, the emitting color of the phosphor becomes closer to a blue range than the point of x: 0.20, y: 0.24 (Y=0.001) in Standard Color Coordinate CIE 1931, and cannot maintain white. When value Y is beyond 0.005, the emitting color of the phosphor becomes closer to a green range than the point of x: 0.29, y: 0.41 (Y=0.005), and cannot maintain while. When improvement in the brightness is intended by adding Tb to a phosphor to manufacture a phosphor for LCS, more preferably, value Y should be $1.5 \times 10^{-3} \leq Y \leq 3.5 \times 10^{-3}$.

As to the phosphor of the first type of the present invention, white luminescent can be obtained by adding only Tb not adding Sm to the phosphor. However, by adjusting Sm content of the phosphor in the range of $5 \times 10^{-2}$ mol or less, preferably $5 \times 10^{-3}$ mol or less, in terms of value Z, there can be obtained a peak in the vicinity of the wavelength of 608 nm in the emission spectrum. Hence, the phosphor of the first type can emit white light containing three color components of B, G and R, and is especially preferable as a phosphor for use of LCS. However, when the content of Sm exceeds $5 \times 10^{-2}$ in terms of value Z, the current properties deteriorates, resulting in a decrease in the brightness. Valve 2 is preferably $1 \times 10^{-4}$ to $5 \times 10^{-3}$.

Figure 7:
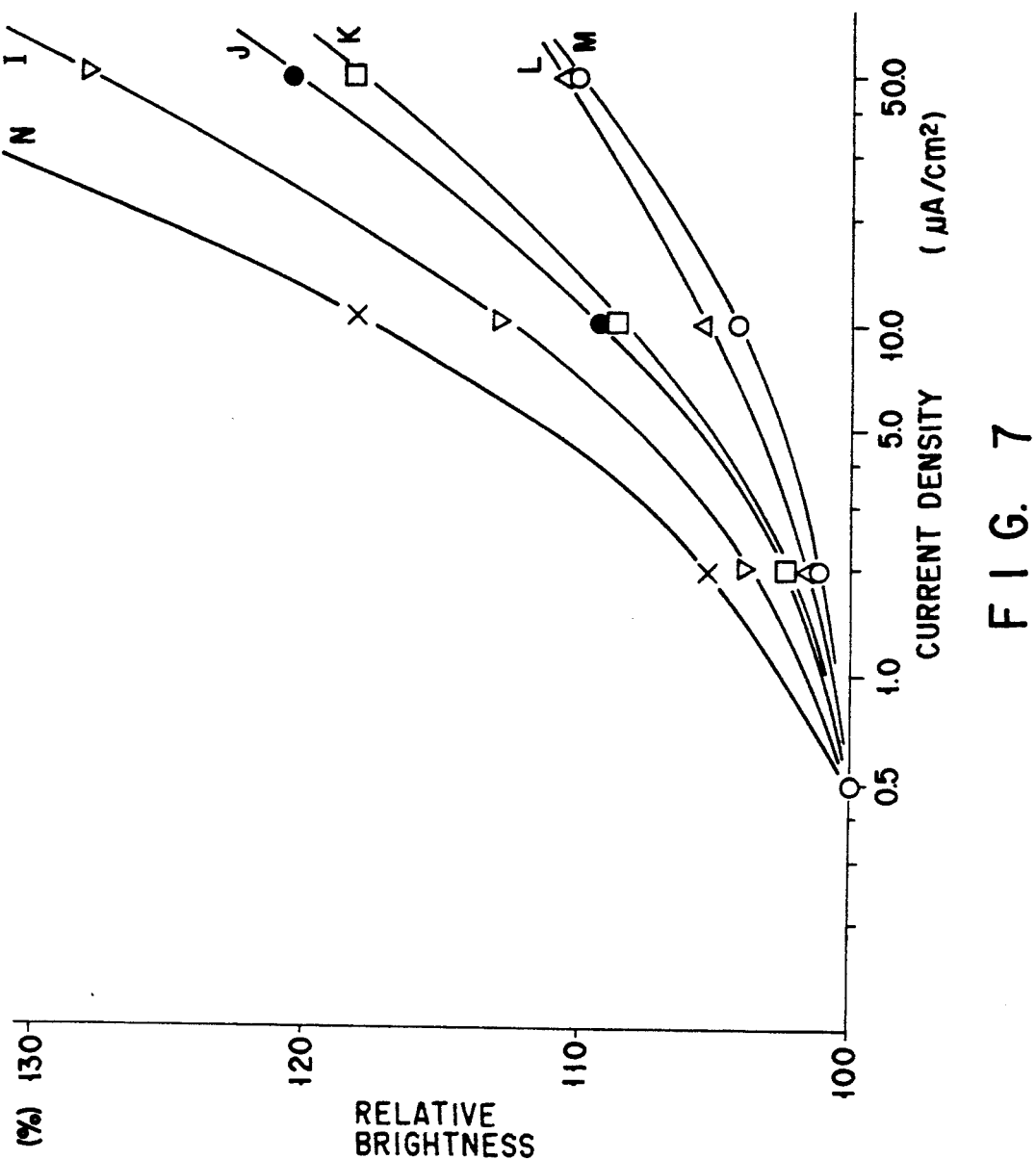
FIG. 7 is a graph showing the relationship between the current density and the relative brightness of various phosphors of the second embodiment of the present invention manufactured, varying according to Yb content relative to the initial brightness thereof when layers formed of the above-described phosphors are excited under an acceleration voltage of 16 kV.
Figure 8:
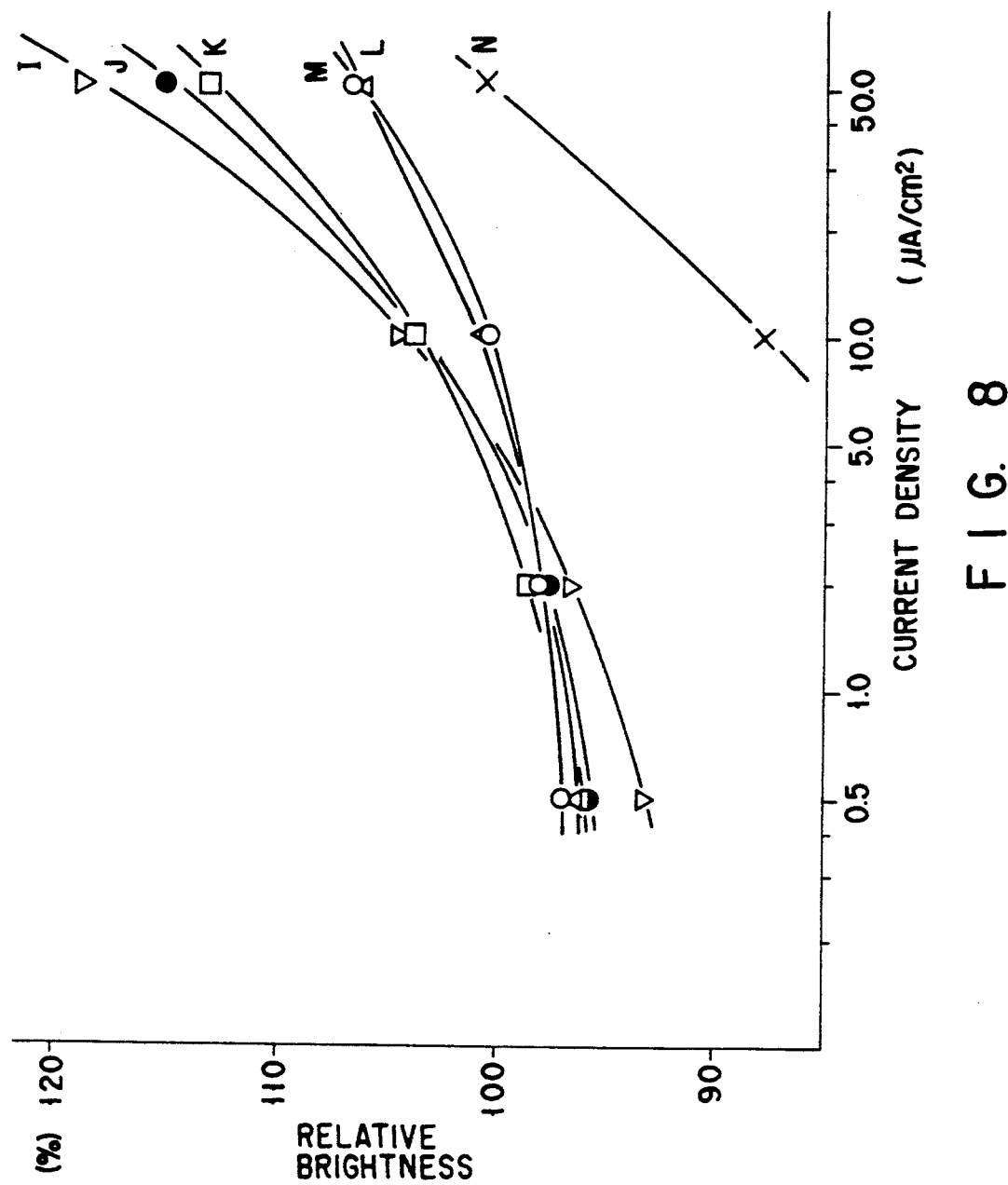
FIG. 8 is a graph showing the relationship between the current density and the relative brightness of various phosphors of the second embodiment of the present invention manufactured, varying according to Yb content relative to the brightness of conventional phosphors when the layers formed of the above-described phosphors are excited under an acceleration voltage of 16 kV.

Next, the phosphor of the second type represented by the following general formula (II) wil be described;

$$(Y_{1-a-b-c} Yb_a Tb_b Sm_c)_2O_2S \qquad (II)$$

wherein
$0 < a \leq 5 \times 10^{-4}$
$1 \times 10^{-3} \leq b \leq 5 \times 10^{-3}$
$0 \leq c \leq 5 \times 10^{-2}$ FIG. 7 is a graph showing the relationship between the current density and the relative brightness of a layer formed of $(Y_{1-a} Yb_a Tb_{0.0025} Sm_{0.0008})_2O_2S$ phosphor of the second embodiment of the present invention varying ytterbium content (value a). In FIG. 8, value a of curves I, J, L, M, and N is $4 \times 10^{-5}, 2 \times 10^{-5}, 10^{-5}, 5 \times 10^{-6}, 2.5 \times 10^{-6}$ and $5 \times 10^{-4}$. The brightnesses of the respective phosphor layers formed of the phosphors I to N are assumed to be 100% when the phosphor layers are excited at a current density of 0.5 $\mu$A/cm2 under an acceleration voltage of 16 kV. The brightness of each phosphor layer is exhibited in a value relative to the 100% brightness described above.

As shown in FIG. 7, The brightness, as well as the current density, of the phosphor of the second embodiment of the present invention is increased by replacing a part of Y with Yb. In addition, no current saturation is observed. It is apparent that the replacement with a small amount of Yb is very effective for the above-described improvements.

FIG. 8 is a graph showing the same relationship as is shown in FIG. 7, except that the relative value of FIG. 7 is replaced by the new relative value which is shown in terms of percentage relative to the brightness of a layer formed of a conventional phosphor represented by the formula of $(Y_{0.9967} Tb_{0.0025} Sm_{0.0008})_2O_2S$ containing no Yb, when the phosphor layer is excited at various current densities under an acceleration voltage of 16 kV.

Figure 9:
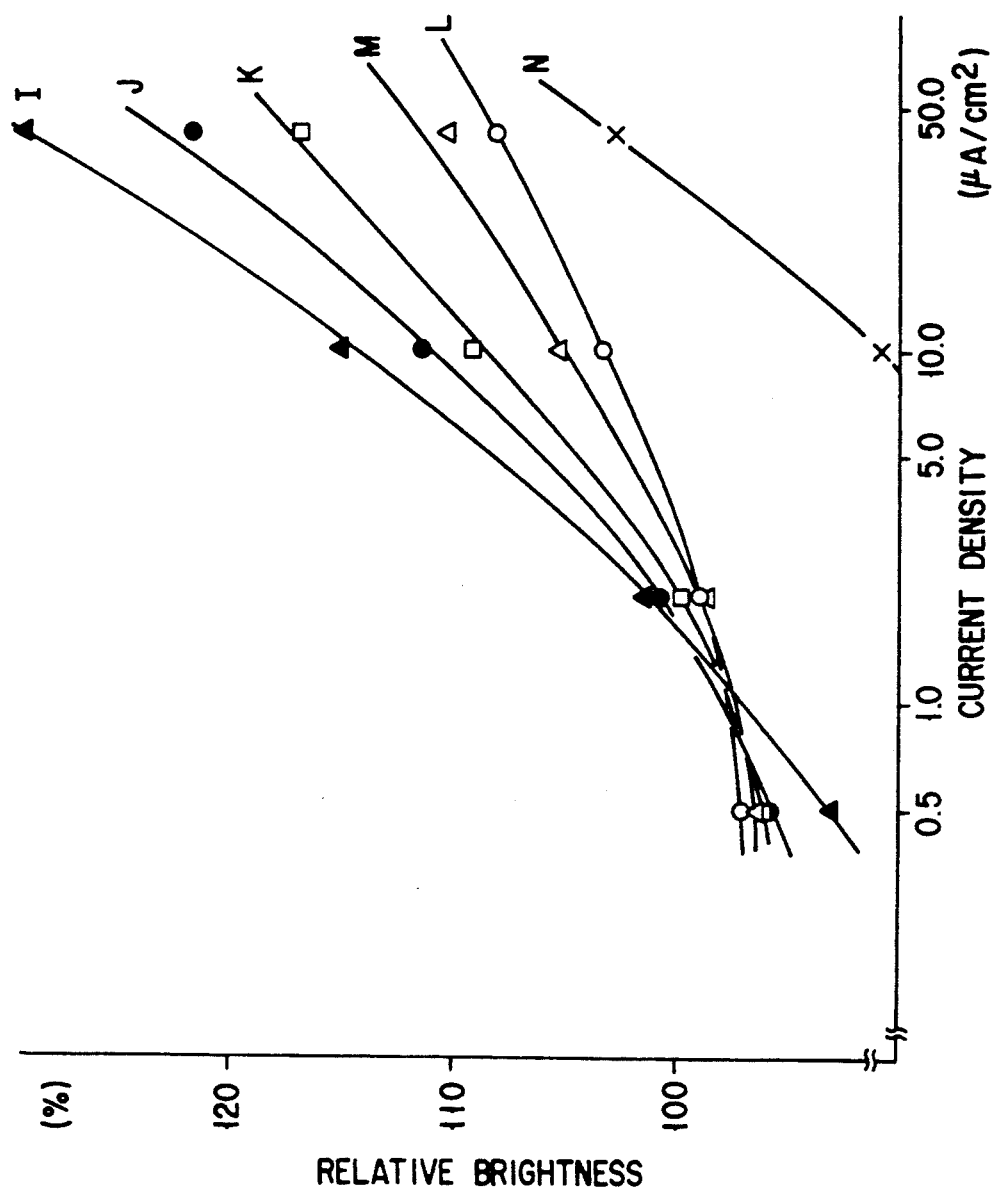
FIG. 9 is a graph showing the relationship between the current density and the relative brightness of the second embodiment of the present invention manufactured, varying according to Yb content relative to the brightness of conventional phosphors when the layers are excited under an acceleration voltage of 27 kV.

FIG. 9 is a graph showing these relationship between the current density and these relative brightness of layers formed of the phosphors I to N when the layers are excited under the same condition as in FIG. 8 except that an acceleration voltage is 27 kV.

As shown FIGS. 8 and 9, in low density range, the phosphor of the second embodiment of the present invention decreases in the brightness to some extent due to the Yb content as compared with conventional phosphors. In the conventional phosphors, the increase in the brightness is not observed due to current saturation accompanied with the increase in the current density. On the other hands, in the phosphor of the second type of the present invention, the current saturation is not observed even if current density is increased. No observation of the current saturation is accomplished by the Yb content to the phosphor. In short, the brightness of the phosphor of the present invention gradually increases in proportion to the current density, even if a phosphor is excited in the high current density range such as 50 $\mu$A/cm2, the phosphor exhibits current properties superior to conventional phosphors.

Figure 10:
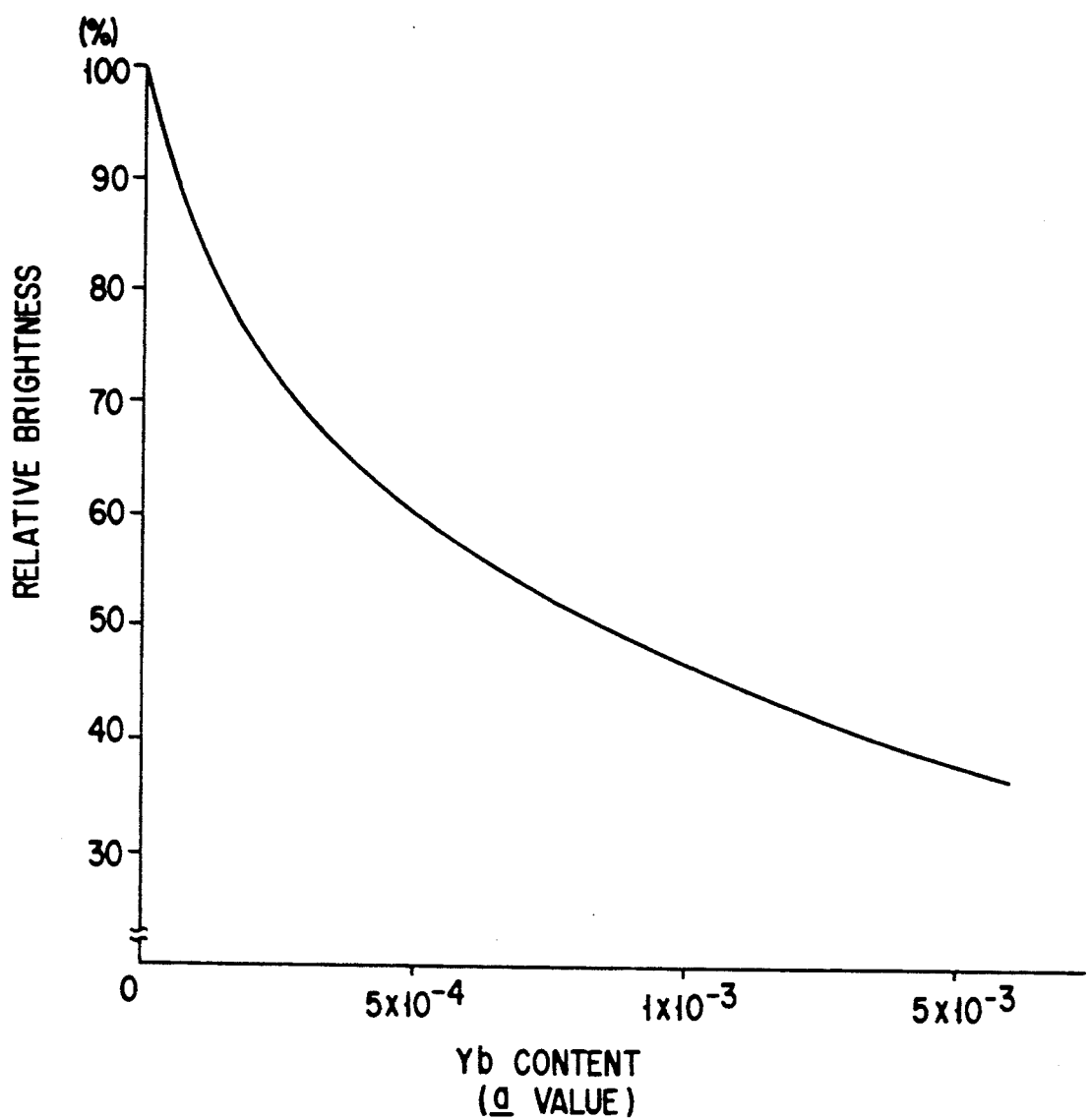
FIG. 10 is a graph showing the relationship between the Yb content and the relative brightness of $(Y_{1-a} Yb_a Tb_{0.0025} Sm_{0.0008})_2O_2$ relative to the brightness of conventional phosphors.

FIG. 10 is a graph showing the relationship between the powder brightness and the content of ytterbium when $(Y_{1-a} Yb_a Tb_{0.0025} Sm_{0.0008})_2O_2S$ phosphor manufactured, varying the value a not only within but also beyond a scope of the present invention is excited at a current density of 0.5 $\mu$A/cm$^2$ under the accelerate voltage of 7 kV. Relative brightness is shown in terms of percentage relative value to 100% brightness of the phosphor powder of $(Y_{0.9967} Tb_{0.0025} Sm_{0.0008})_2O_2S$ containing no Yb when the phosphor layer is excited by a current density of 0.5 $\parallel$ A/cm$^2$ under an accelerate voltage of 7 kV.

Figure 11:
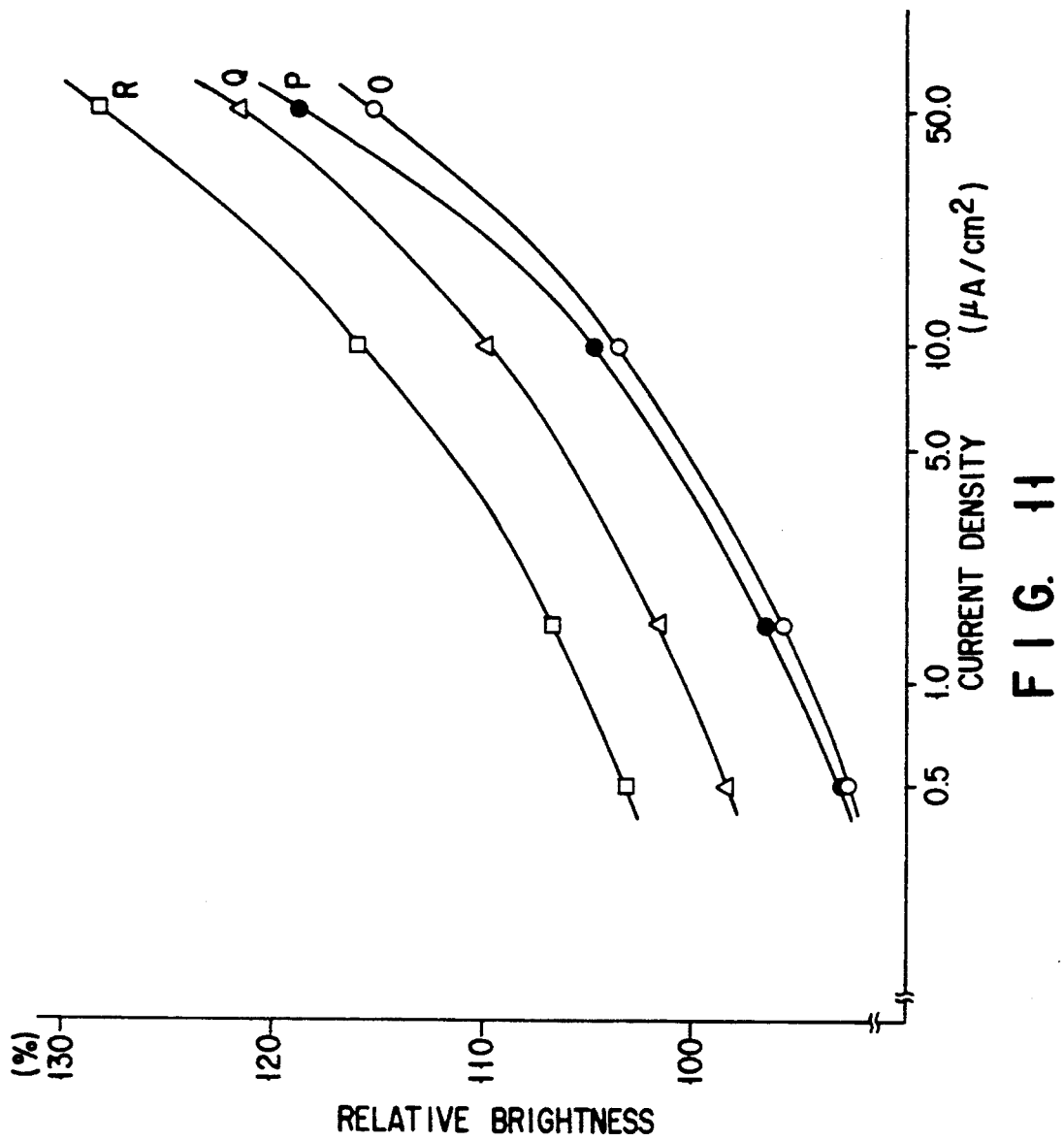
FIG. 11 is a graph showing the relationship between the current density and the relative brightness of various types of $(Y_{1-b} Yb_{0.00004} Tb_b Sm0.0008)2O2$ phosphors manufactured, varying according to the Tb content.

FIG. 11 is a graph showing the relationship between the current density and the relative brightness of a layer formed of $(Y_{1-b} Yb_{0.00004} Tb_b Sm_{0.0008})_2O_2S$ phosphor varying the content of terbium (value b). In this graph, value b of O, P, Q, and R is 0.0025, 0.0028, 0.003 and 0.0035, respectively. As is the same graph shown in FIG. 10, relative brightness is exhibited in a relative value to the brightness of a layer formed of $(Y_{0.9967} TbO_{.0025} SmO_{.0008})_2O_2S$ phosphor containing no Tb to assumed to be 100% when the phosphor layer is excited by various densities under an acceleration voltage of 16 kV. As shown in FIG. 10, in proportion to the Yb content, the relative brightness of the phosphor layers tends to decrease. However, as shown in FIG. 11, the deterioration in the brightness caused by the Yb content is prevented by increasing Tb content.

As described above, in the phosphor of the present invention represented by the general formula $(Y_{1-a-b-c} Yb_a Tb_b Sm_c)_2O_2S$, when the Yb content is larger than 0 in terms of value a, the brightness saturation caused by the increase in the current density tends to be suppressed; by contrast, the brightness thereof tends to be decreased. Illustratively stated, as practical value, value a is in the range of $5 \times 10^{-4}$ or less. In FIG. 8, phosphor N having value a of $5 \times 10^{-4}$ shows the relative brightness of 98% when excited at a current density of 50 $\mu$A/cm$^2$. The practical value a may be 0.0005 or less taking into consideration the decrease in the initial brightness when the phosphor layer is excited at a current density of 0.5 $\mu$A/cm$^2$. Valve a is preferably $2.5 \times 10^{-6}$ to $4 \times 10^{-5}$.

Figure 1:
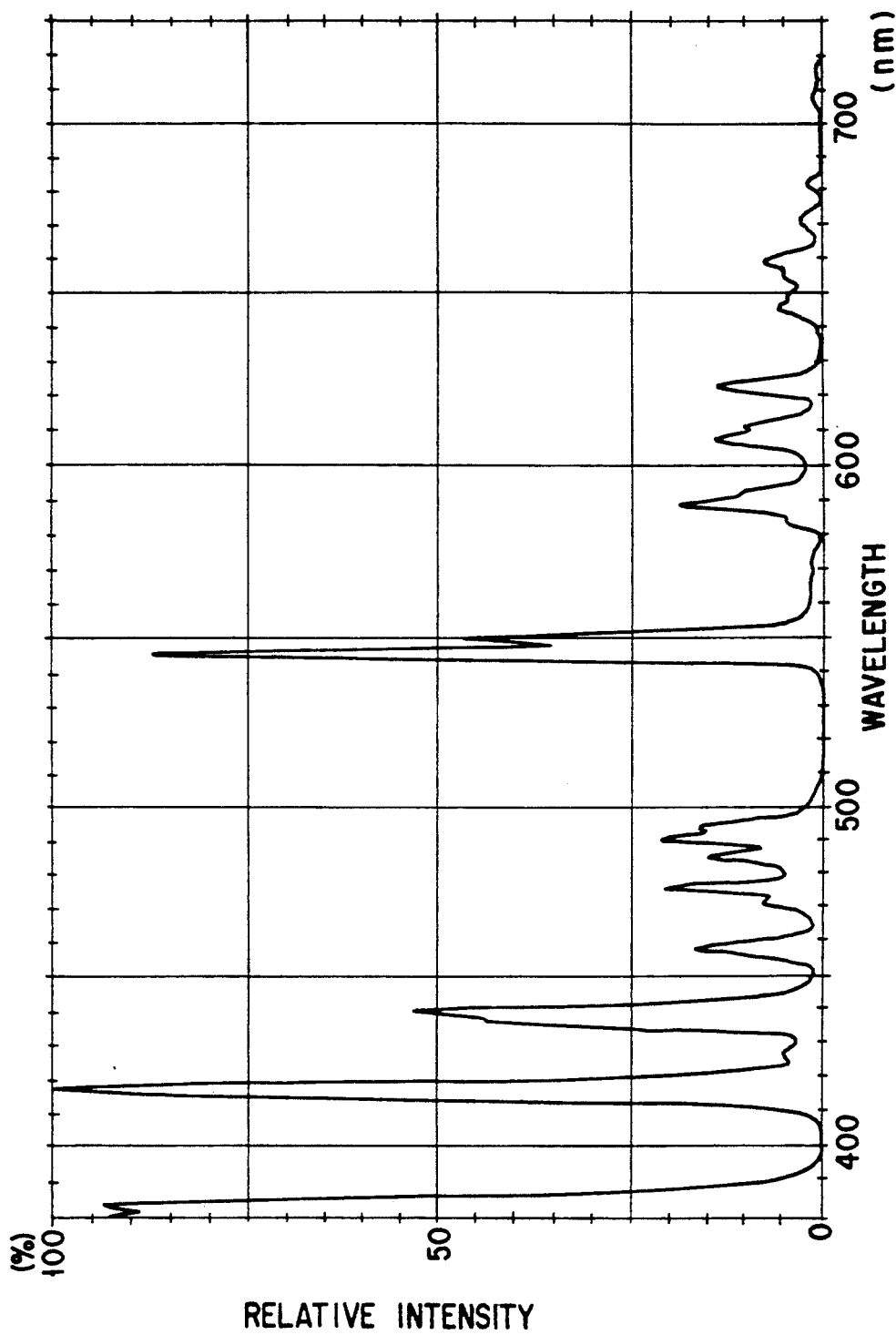
FIG. 1 is a graph showing a luminescent spectrum of a conventional emitting white phosphor.

Shown in FIG. 1, there are obtained peaks at the wavelengths in the vicinity of 418 nm and 545 nm when value b is $1 \times 10^{-3}$ or more. In proportion to the increase in the Tb content, the peak value at the wavelength of 545 nm is increased; by contrast, the peak value at the wavelength of 418 nm is decreased. Taking a balance of the both peaks into consideration, a preferable range of providing acceptable white luminescence is determined to be $1 \times 10^{-3} \leq b \leq 5 \times 10^{-3}$. As the same time the deterioration in the brightness caused by the Yb content is prevented by increasing Tb content.

In the phosphor of the present invention can achieve white luminescence by adding only Tb not adding Sm to the phosphor. In particular, by adding Sm to the phosphor in the content of $5 \times 10^{-2}$ mol or less, preferably $5\times10^{-3}$ mol or less in terms of c value, there is obtained a luminescence having the peak at the wavelength in the vicinity of 608 nm. Hence, the phosphor containing a certain amount of Sm can emit white light containing three color components of B, G and R, and is the most preferable phosphor for use in a LCS. However, if the Sm content is beyond $5\times10^{-2}$ in terms of value c, the current properties deteriorates, resulting in a decrease in the brightness. Valve c is preferably $1\times10^{-3}$ to $5\times10^{-3}$.

Finally, the third embodiment of the present invention represented by the general formula (III) will be described.

Figure 12:
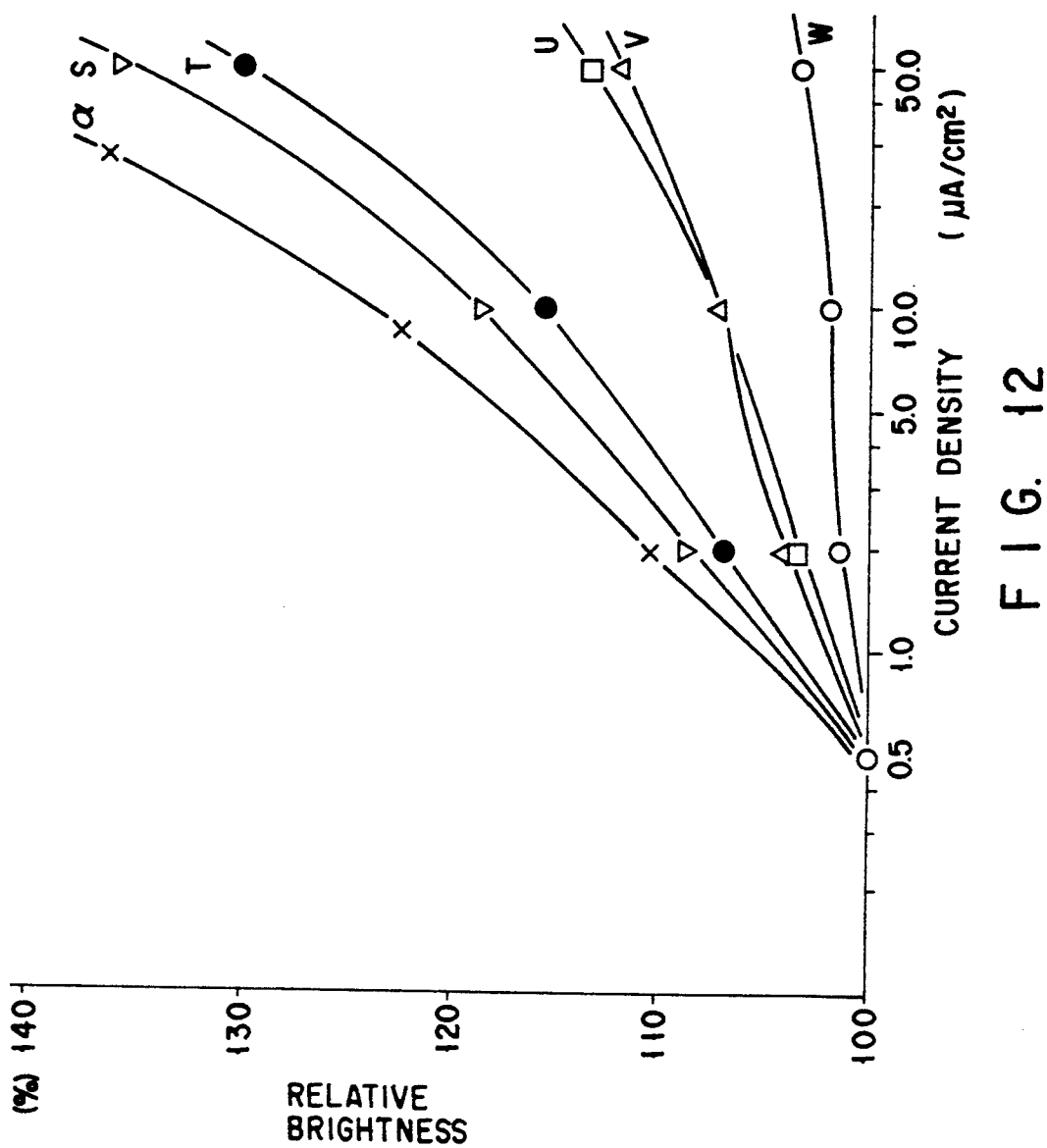
FIG. 12 is a graph showing the relationship between the current density and the relative brightness of various phosphors of the third embodiment of the present invention manufactured, varying according to Yb content relative to conventional phosphors when layers formed of the above-described phosphors are excited under an acceleration voltage of 16 kV.

(III)

wherein:
$0 < d \leq 1\times10^{-4}$
$1\times10^{-3} \leq e \leq 5\times10^{-3}$
$0 \leq f \leq 5\times10^{-2}$ FIG. 12 is a graph showing the relationship between the current density and the relative brightness of a layer formed of $(Y_{1-d} Ce_d Tb_{0.0025} Sm_{0.0008})_2O_2S$ phosphor of the third type of the present invention. In FIG. 12, value d of S, T, U, V, X, W and c is $4\times10^{-5}$, $2\times10^{-5}$, $1\times10^{-5}$, $5\times10^{-6}$, $2.5\times10^{-6}$ and $1\times10^{-4}$. In this FIG. 12, the brightness of the phosphors S to W excited at various current densities is shown as the relative brightness in terms of percentage relative value to 100% brightness of respective phosphor layers formed of the phosphors S to W when the phosphor layers are excited by a current density of 0.5 $\mu A/cm_2$ under an acceleration voltage of 16 kV. The acceleration pressure is fixed to 16 kV during this experiment.

As shown in FIG. 12, The brightness as well as the current density of the phosphor of the present invention is increased by replacing of a part of Y with Ce. In addition, no current saturation is observed. It is apparent that the replacement of Yb with a small amount of Ce is very effective for the above-described improvements.

Figure 13:
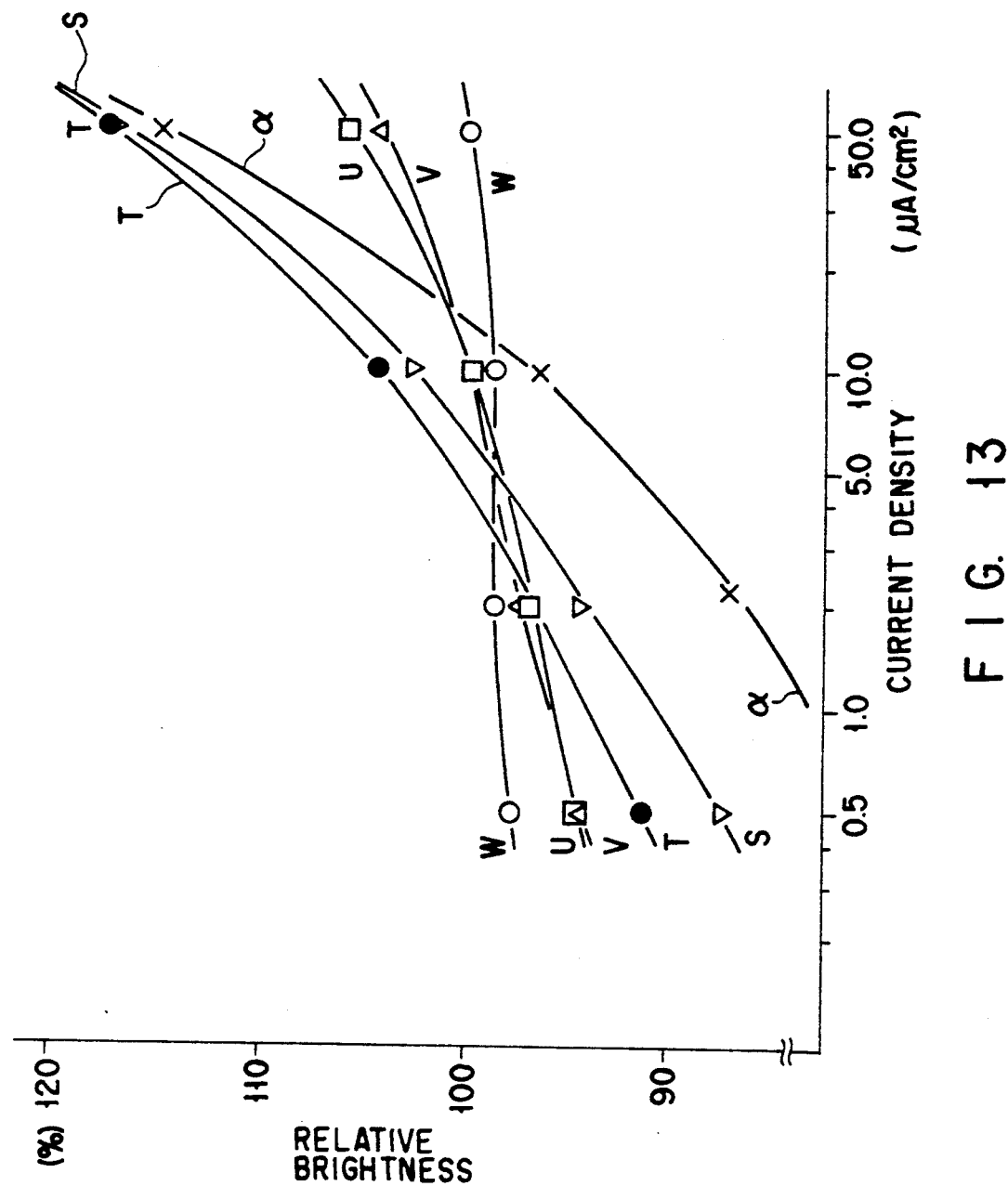
FIG. 13 is a graph showing the relationship between the current density and the relative brightness of the third embodiment of the present invention manufactured, varying according to Yb content relative to the brightness of conventional phosphors when the layers formed by the above-described phosphors are excited under an acceleration voltage of 16 kV.

FIG. 13 is a graph showing the same relationship as is shown in FIG. 12, except that the relative value of FIG. 12 is replaced by new relative value in terms of percentage relative to the brightness of a layer formed of $(Y_{0.9967} Tb_{0.0025} Sm_{0.0008})_2O_2S$ phosphor containing no Ce, when the phosphor layer is excited at various current densities under an acceleration voltage of 16 kV.

Figure 14:
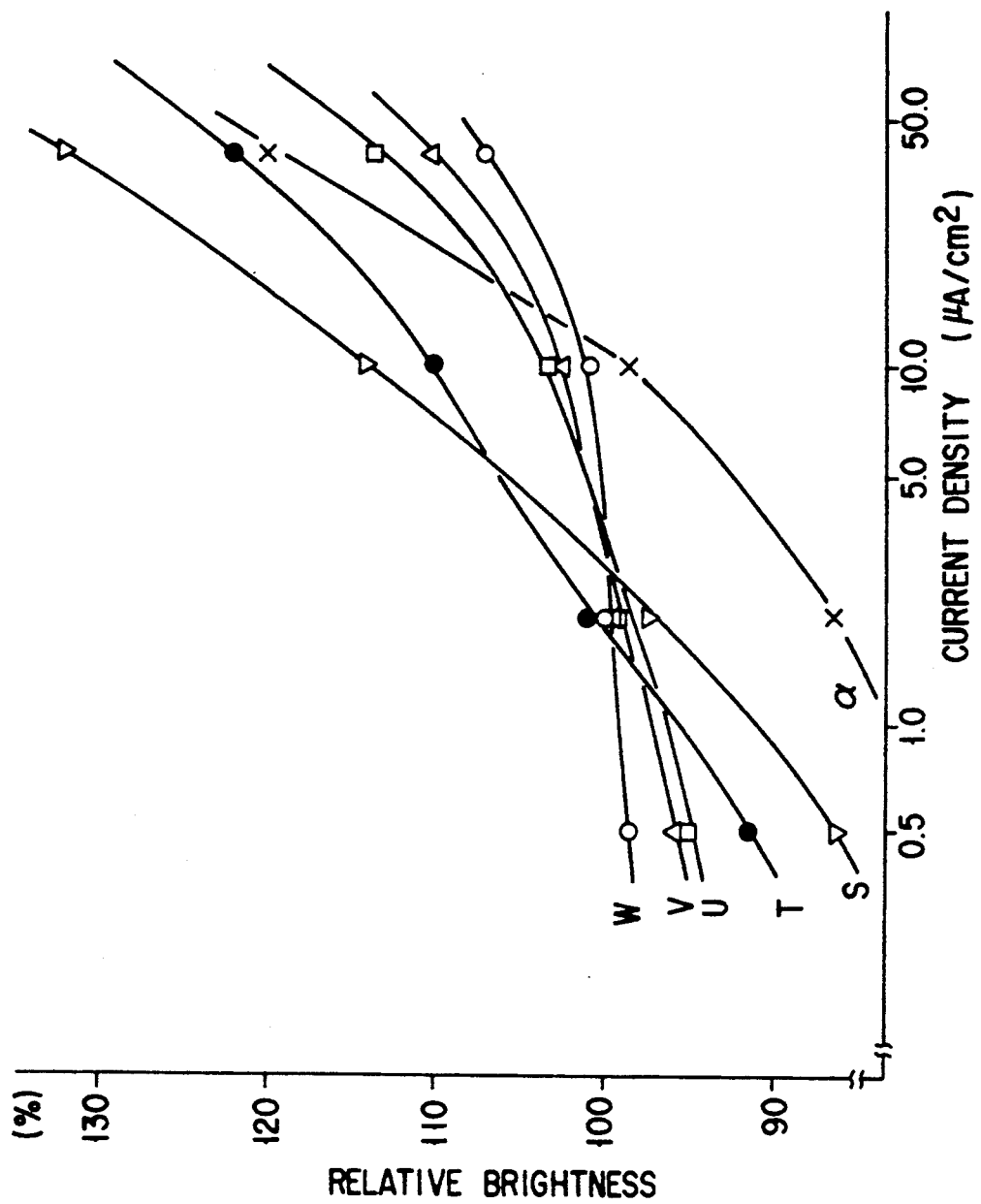
FIG. 14 is a graph showing the relationship between the Yb content and the relative brightness of various phosphor of the third embodiment of the present invention manufactured, varying according to Yb content relative to the brightness of conventional phosphors when the layers formed of above-described phosphors are excited under an acceleration voltage of 27 kV.

FIG. 14 is graph showing the relationship between the current density and the relative brightness of the phosphors S to $\alpha$ measured under the same condition as in FIG. 13 except that an acceleration pressure is 27 kV.

As shown in FIGS. 13 and 14, in the low current density range, the initial brightness of the phosphor of the present invention decreases due to Yb content as compared with the initial brightness of conventional phosphors. In proportion to the increase in current density, current saturation is observed in conventional phosphors so that brightness is suppressed. However, in proportion to the increase in the current density, the current saturation is not observed in the phosphor of the present invention, on the contrary, the brightness is gradually increased. The results described above is accomplished by Ce content to the phosphor. Furthermore, the phosphor of the present invention has current properties superior to that of the conventional phosphors in the high current density range.

Figure 15:
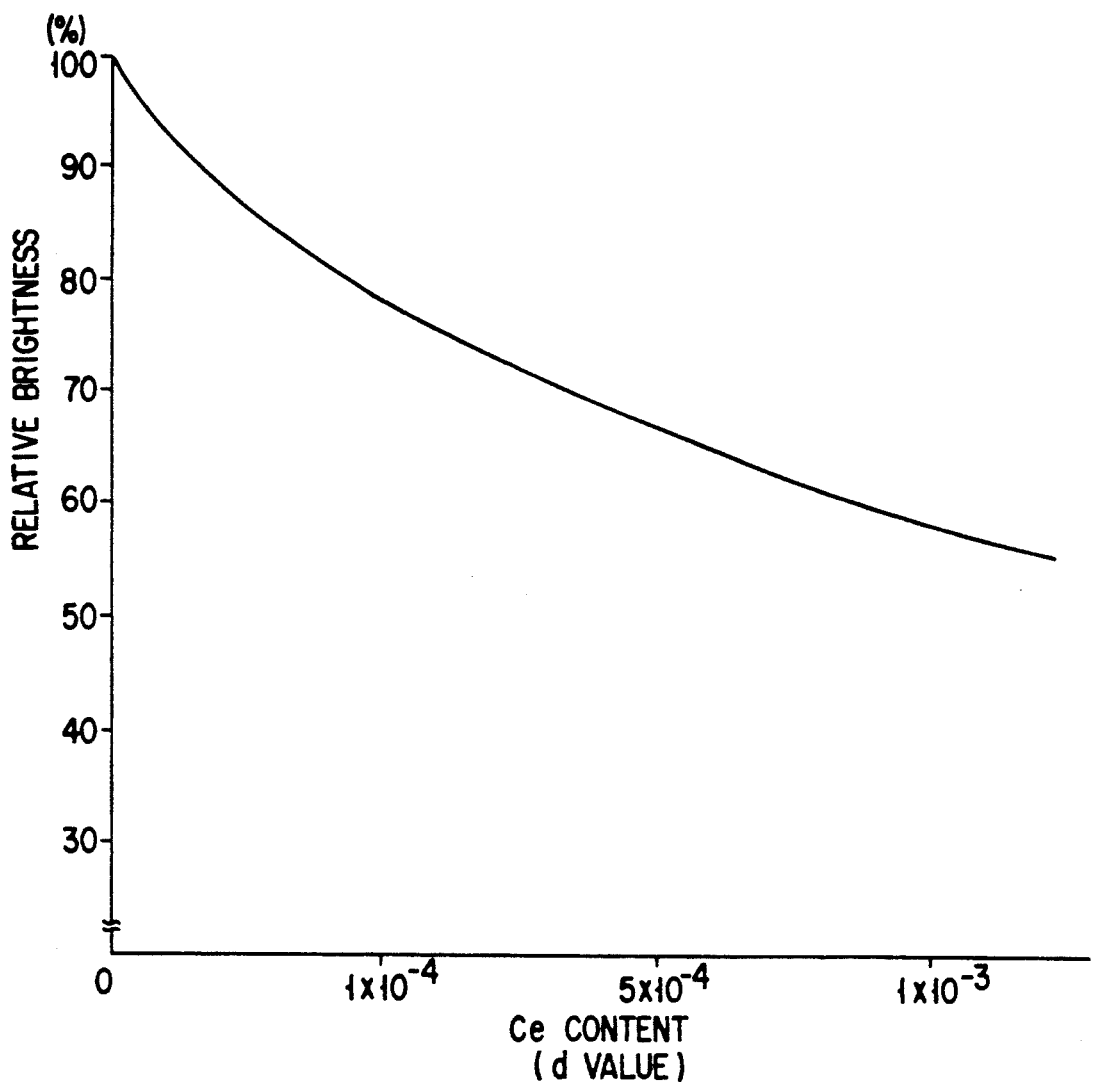
FIG. 15 is a graph showing the relationship between the current density and the relative brightness of various types of $(Y_{1-d} Ce_d Tb_{0.0025} Sm_{0.0008})_2O_2$ phosphors manufactured, varying according to Yb content relative to the brightness of conventional phosphors.

FIG. 15 is a graph to showing the relationship between the powder brightness and the cerium content of $(Y_{1-d} Ce_d Tb_{0.0025} Sm_{0.0008})_2O_2S$ phosphor which is manufactured increasing according to Yb content not only within but also beyond a scope of the present invention in terms of value d when the phosphor is excited at a current density of 0.5 $\mu A/cm2$ under an acceleration voltage of 7 kV. In FIG. 15, the relative brightness is shown in terms of percentage relative to the brightness of $(Y_{0.9967} Yb_{0.0025} Sm_{0.0008})_2O_2S$ phosphor containing no Ce when the phosphor is excited at a current density of 0.5 $\mu A/cm^2$ under an acceleration voltage of 7 kV.

Figure 16:
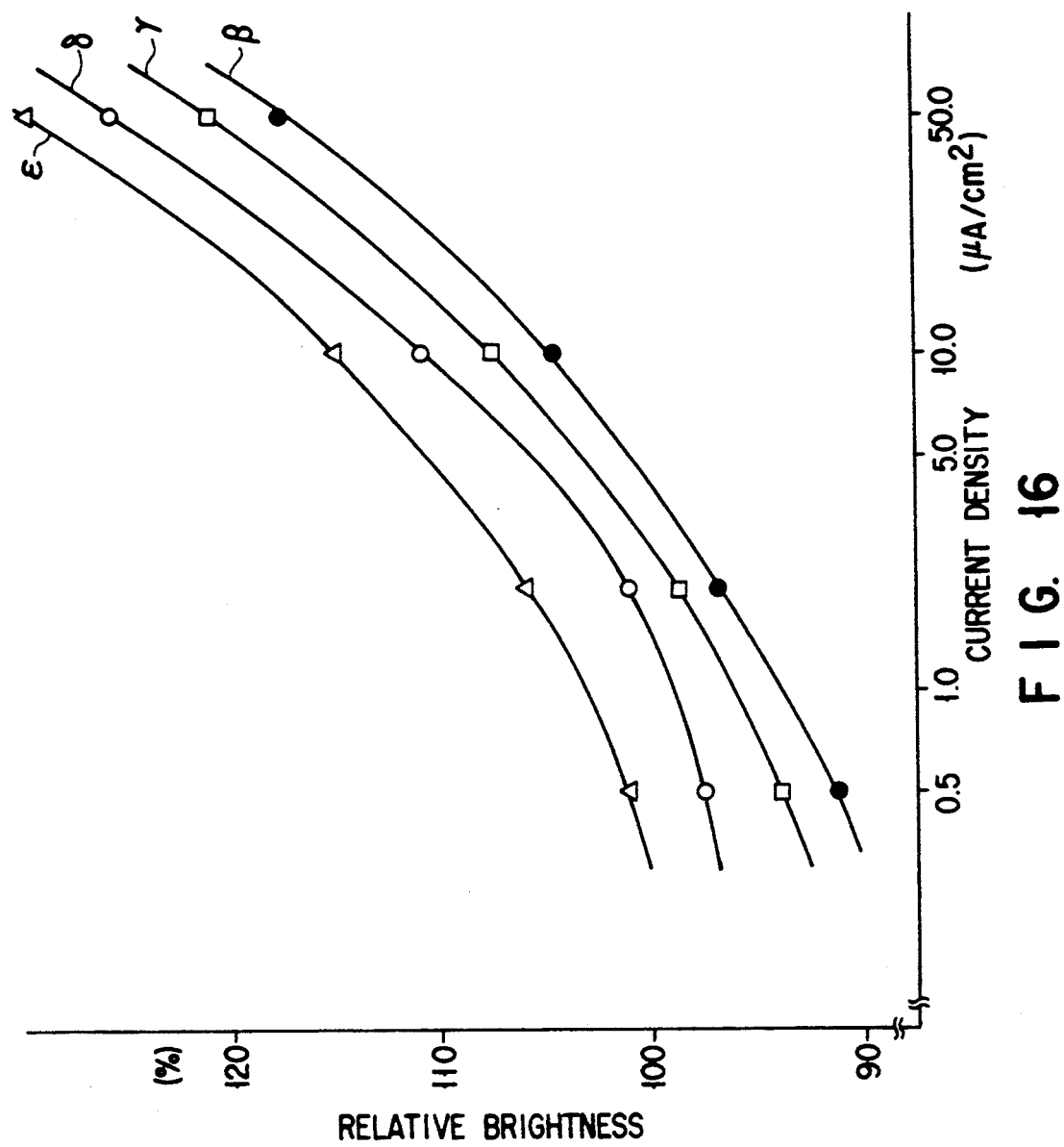
FIG. 16 is a graph showing the relationship between the current density and the relative brightness of various types of (Y1-e CeO.00004 Tbe Sm0 0008)2O2 phosphors manufactured, varying according to Tb content.

FIG. 16 is a graph showing the relationship between the current density and the relative brightness of a layer formed of $(Y_{1-e} Ce_{0.0004} Tb_e Sm_{0.0008})_2O_2S$ phosphor, which is manufactured, varying according to Tb content (value e). In FIG. 17, value e of $\beta$, $\gamma$, $\delta$ and $\epsilon$ is 0.0025, 0.0028, 0.003 and 0.035. The relative brightness is shown in terms of percentage relative to the brightness of a phosphor layer formed of $(Y_{0.9967} Tb_{0.0025} Sm0.0008)_2O2S$ phosphor containing no Ce is assumed to be 100% when the phosphor layer is excited at various current densities under an acceleration voltage of 16 kV.

As shown in FIG. 15, in proportion to the increase in the Ce content, the brightness tends to decrease. However, as to the phosphor in FIG. 16, the deterioration in the brightness caused by Ce is prevented by increasing Tb content.

As described above, in a phosphor represented by a general formula $(Y_{1-d-e-f} Ce_d Tb_e Sm_f)_2O_2S$, the brightness saturation caused by increasing the current density tends to decrease when the Ce content is larger than 0 in terms of value d. By contrast, the brightness tends to decrease in the low current density range. As practical value, d is $1\times10^{-4}$ or less, more preferably, $2.5\times10^{-6}$ or more, and $4\times10^{-5}$ or less. Phosphor $\alpha$ in FIG. 14 having value d of $1\times10^{-4}$ has brightness of about 80% when excited at a current density of 0.5 $\mu A/cm^2$ and brightness of about 115% when excited at a current density of 50 $\mu A/cm^2$. The upper limit of value d is therefore considered to be $1\times10^{-4}$ to compensate for a decrease at a current density of 0.5 $\mu A/cm^2$.

Furthermore, several types of phosphors are manufactured, varying according to the Tb content(value e). Each luminescence spectrum is measured of layers formed of the above obtained phosphors. When value e is approximately $1\times10^{-3}$ or more, there are obtained peaks at the wavelengths in the vicinity of 418 nm and 545 nm, respectively. In proportion to the increase in value e, the peak value at the wavelength of 545 nm increases, whereas the peak value at the wavelength of 418 nm decrease. A preferable range of providing acceptable white luminescence keeping a balance between the both peaks is determined as the range of $1\times10^{-3} \leq e \leq 5\times10^{-3}$. In addition, by increasing Tb content, the decrease in the brightness caused by the Ce content can be suppressed.

The phosphor of the present invention can be achieve white luminescent by adding only Tb not adding Sm to the phosphor. However, by adding Sm to the phosphor in the content of $5\times10^{-2}$ mol or less, preferably $5\times10^{-3}$ mol and less in terms of value f, there is obtain a light emitting having the peak in the vicinity of the wavelength of 608 nm in the luminescence spectrum. Hence, the phosphor of the present invention can emit white light containing three color components of B, G and R, and is especially preferable for use in a LCS. If the Sm content is beyond 0.05 in terms of value f, the current properties deteriorates, resulting in a decrease in the brightness. Valve f is preferably $1\times 10^{-4}$ to $5\times 10^{-3}$.

Hereinbelow, the present invention will be described in more detail with reference to the following Examples including evaluation results of the burning with respect to the phosphor of the present invention.

EXAMPLES 1-8

As raw materials for manufacturing a phosphor, yttrium oxide($Y_2O_3$), lutetium oxide ($Lu_2O_3$), terbium oxide ($Tb_4O_7$), samarium oxide ($Sm_2O_3$) and sulfur and as a flux thereof, sodium carbonate ($Na_2CO_3$) were measured in the contents shown in Table 1. The above-measured materials were dry-bended sufficiently, and fill in an aluminum crucible. Then, the aluminum crucible containing dry-blended materials was covered with a lid, and the materials were subjected to the baking for 3 hours at 1100° C. After the completion of the baking, the resultant mixture was washed with water a few times removing the flux, and was dried at 120° C. for 5 hours, thereby obtaining a phosphor.

The phosphor thus obtained was coated on a slide glass with a binder and excited by force at a current density of 10 $\mu A/cm^2$ under an acceleration voltage of 27 kV for 30 minutes. No color change was appeared on the entire coating surface, and brightness before and after the baking showed the same value. From the results it is concluded that no burning has occurred. Color coordinates of the obtained phosphors are represented in Table 2. This is also supported by the fact that no change in the color coordination was observed of individual phosphors before or after the baking, as shown in table 2.

Phosphors obtained in Examples 1 to 5 correspond to the phosphors, A, B, C, D and E shown in FIGS. 2, 3 and 4, respectively.

EXAMPLES 9 TO 14

As raw materials for manufacturing a phosphor, yttrium oxide ($Y_2O_3$), ytterbium oxide ($Yb_2O_3$), terbium oxide ($Tb_4O_7$), samarium oxide ($Sm_2O_3$) and sulfur and as a flux thereof, sodium carbonate ($Na_2CO_3$) were measured in the content shown in Table 3. The above-measured materials were dry-blended sufficiently, and packed in an aluminum crucible. Then the aluminum crucible was covered with a lid, and the materials were subjected to the baking for 3 hours at 1100° C. After the completion of the baking, the resultant mixture was washed with water a few times, removing the flux, and was dried at 120° C. for 5 hours, thereby obtaining a phosphor of the present invention.

Phosphors obtained in Examples 9 to 14 correspond to the phosphors, M, L, K, J, I and N shown in tables 7 and 9, respectively.

The phosphors thus obtained was coated on a slide glass with a binder and excited at a current density of 10 $\mu A/cm^2$ under an acceleration voltage of 27 kV for 30 minutes. No color change was observed on the entire coating surface, and brightness before and after the baking showed the same value. From the results it is concluded that no burning has occurred. This is also supported by the fact that no change in the color coordination was observed of individual phosphors before or after the baking as shown in Table 4.

TABLE 3

| Example | $Y_2O_3$(g) | $Yb_2O_3$(g) | $Tb_4O_7$(g) | $Sm_2O_3$(g) | S(g) | $Na_2CO_3$(g) |
|---|---|---|---|---|---|---|
| 9(M) | 497.3602 | 0.0022 | 2.0622 | 0.6165 | 270 | 180 |
| 10(L) | 497.3580 | 0.0040 | 2.0622 | 0.6165 | " | " |
| 11(K) | 497.3538 | 0.0087 | 2.0621 | 0.6165 | " | " |
| 12(J) | 497.3450 | 0.0174 | 2.0621 | 0.6165 | " | " |
| 13(I) | 497.3276 | 0.0348 | 2.0621 | 0.6165 | " | " |
| 14(N) | 496.8864 | 0.4350 | 2.0621 | 0.6165 | " | " |

The luminescence spectrums ware measured, respectively. The result of the measurements were similar to a graph in FIG. 1.

TABLE 1

| Example | $Y_2O_3$(g) | $Lu_2O_3$(g) | $Tb_4O_7$(g) | $Sm_2O_3$(g) | S(g) | $Na_2CO_3$(g) |
|---|---|---|---|---|---|---|
| 1 | 992.97 | 1.75 | 4.13 | 1.23 | 530 | 350 |
| 2 | 986.00 | 8.75 | 4.12 | 1.23 | " | " |
| 3 | 977.33 | 17.43 | 4.10 | 1.22 | " | " |
| 4 | 943.33 | 51.51 | 4.04 | 1.21 | " | " |
| 5 | 910.32 | 84.60 | 3.98 | 1.19 | " | " |
| 6 | 985.52 | 8.75 | 4.61 | 1.23 | " | " |
| 7 | 985.20 | 8.74 | 4.94 | 1.23 | " | " |
| 8 | 984.40 | 8.74 | 5.76 | 1.23 | " | " |

TABLE 2

| | | Color coordinate | |
|---|---|---|---|
| Example | Formula | x | y |
| 1 | $(Y_{0.9957}Lu_{0.001}Tb_{0.0025}Sm_{0.0008})_2O_2S$ | 0.271 | 0.291 |
| 2 | $(Y_{0.9917}Lu_{0.005}Tb_{0.0025}Sm_{0.0008})_2O_2S$ | 0.270 | 0.289 |
| 3 | $(Y_{0.9867}Lu_{0.010}Tb_{0.0025}Sm_{0.0008})_2O_2S$ | 0.270 | 0.290 |
| 4 | $(Y_{0.9667}Lu_{0.030}Tb_{0.0025}Sm_{0.0008})_2O_2S$ | 0.270 | 0.290 |
| 5 | $(Y_{0.9467}Lu_{0.050}Tb_{0.0025}Sm_{0.0008})_2O_2S$ | 0.268 | 0.284 |
| 6 | $(Y_{0.9917}Lu_{0.005}Tb_{0.0028}Sm_{0.0008})_2O_2S$ | 0.271 | 0.297 |
| 7 | $(Y_{0.9912}Lu_{0.005}Tb_{0.0030}Sm_{0.0008})_2O_2S$ | 0.272 | 0.303 |
| 8 | $(Y_{0.9907}Lu_{0.005}Tb_{0.0035}Sm_{0.0008})_2O_2S$ | 0.274 | 0.312 |

TABLE 4

| | Color coordinate | |
|---|---|---|
| Example | x | y |
| 9(M) | 0.272 | 0.293 |
| 10(L) | 0.272 | 0.294 |
| 11(K) | 0.271 | 0.294 |
| 12(J) | 0.273 | 0.292 |
| 13(I) | 0.273 | 0.295 |
| 14(N) | 0.273 | 0.295 |

EXAMPLES 15 TO 20

As raw materials for manufacturing a phosphor, yttrium oxide ($Y_2O_3$), cerium oxide ($Ce_2O_3$), terbium oxide ($Tb_4O_7$), samarium oxide ($Sm_2O_3$) and sulfur and as a flux thereof, sodium carbonate ($Na_2CO_3$) were measured in the content shown in Table 5. The above-measured materials were dry-blended sufficiently, and filled in an aluminum crucible. Then, the aluminum crucible was covered with a lid, and the material were subjected to a baking for 3 hours at 1100° C. After the completion of the baking, the resultant mixture was washed with water a few times, removing the flux and was dried at 120° C. for 5 hours, thereby obtaining a phosphor of the present invention.

Phosphors obtained in Examples 15 to 20 correspond to the phosphors S to W and u shown in FIGS. 12 to 14, respectively.

The phosphor thus obtained was coated on a slide glass with a binder and excited at a current density of 10 $\mu A/cm^2$ under an acceleration voltage of 27 kV for 30 minutes. No color change was observed on the entire coated surface, and brightness before and after the baking showed the same value. From the results it is concluded that no burning has occurred. This is also supported by the fact that no color change in the color coordination was observed of individual phosphors before or after the baking as shown in Table 6.

TABLE 5

| Example | $Y_2O_3$(g) | $Ce_2O_3$(g) | $Tb_4O_7$(g) | $Sm_2O_3$(g) | S(g) | $Na_2CO_3$(g) |
|---|---|---|---|---|---|---|
| 15S | 994.6664 | 0.0580 | 4.1307 | 1.2333 | 530 | 350 |
| 16T | 994.6954 | 0.0290 | 4.1307 | 1.2333 | " | " |
| 17U | 994.7099 | 0.0145 | 4.1308 | 1.2333 | " | " |
| 18V | 994.7171 | 0.0073 | 4.1308 | 1.2333 | " | " |
| 19W | 994.7207 | 0.0036 | 4.1308 | 1.2333 | " | " |
| 20α | 994.4910 | 0.1450 | 4.1307 | 1.2333 | " | " |

TABLE 6

| Example | Color coordinate x | Color coordinate y |
|---|---|---|
| 15S | 0.272 | 0.292 |
| 16T | 0.272 | 0.291 |
| 17U | 0.270 | 0.292 |
| 18V | 0.270 | 0.292 |
| 19W | 0.273 | 0.295 |
| 20α | 0.273 | 0.296 |

A luminescence spectrums were measured, respectively. The graph of the measurements were similar to a graph in FIG. 1.

As described above, the rare earth phosphor of the present invention achieves remarkable improvement in current properties and scarcely develops current saturation or burning, due to the content of Lu, Yb or Ce in the phosphor. The phosphor of the present invention is superior in current properties so that its color coordination does not change, and is therefore an excellent phosphor. Accordingly, when the phosphor is used for a monochrome CRT for a LCS, the improvement in the brightness is attained even if the current density is increased. The brightness level of the LCS display is enhanced to that of a CRT display.

Furthermore, the phosphor of the present invention is useful; it can be used not only for a LCS display screen but also a monochrome CRT display.

Additional advantages and modifications will readily occur to those skilled in the art. Therefore, the invention in its broader aspects is not limited to the specific details, and representative materials shown and described herein. Accordingly, various modifications may be made without departing from the spirit or scope of the general inventive concept as defined by the appended claims and their equivalents.

What is claimed is:

1. A rare earth phosphor represented by the formula:

$$(Y_{1-x-y-z}Lu_xTb_ySm_z)_2O_2S$$

wherein:

$1\times10^{-3} \leq x \leq 5\times10^{-2}$
$1.0\times10^{-3} \leq y \leq 5\times10^{-3}$
$0 \leq z \leq 5\times10^{-2}$ 2. The phosphor according to claim 1, wherein said value Z is $1\times10^{-4}$ to $5\times10^{-2}$, and said phosphor emits white luminescence when being excited by electron beams, said white luminescence including a green luminescence spectrum, a blue luminescence spectrum, and a red luminescence spectrum which has a peak in the vicinity of 608 nm.

3. The phosphor according to claim 1, wherein said value X is 0.001 to 0.03.

4. The phosphor according to claim 1, wherein said value Y is $1.5\times10^{-3}$ to $3.5\times10^{-3}$.

* * * * *